No. 845,091. PATENTED FEB. 26, 1907.
F. P. HUYCK.
VARIABLE SPEED TRANSMISSION.
APPLICATION FILED NOV. 14, 1904.
2 SHEETS—SHEET 2.
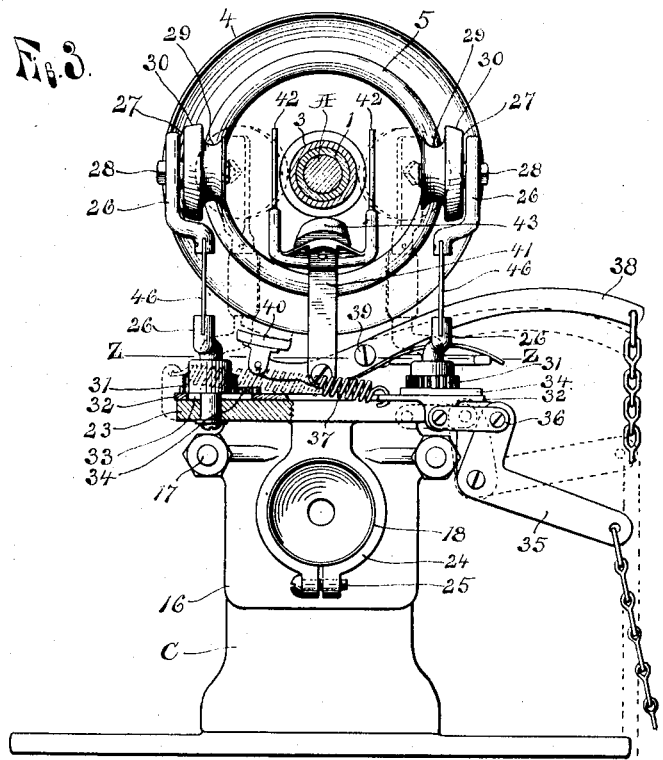
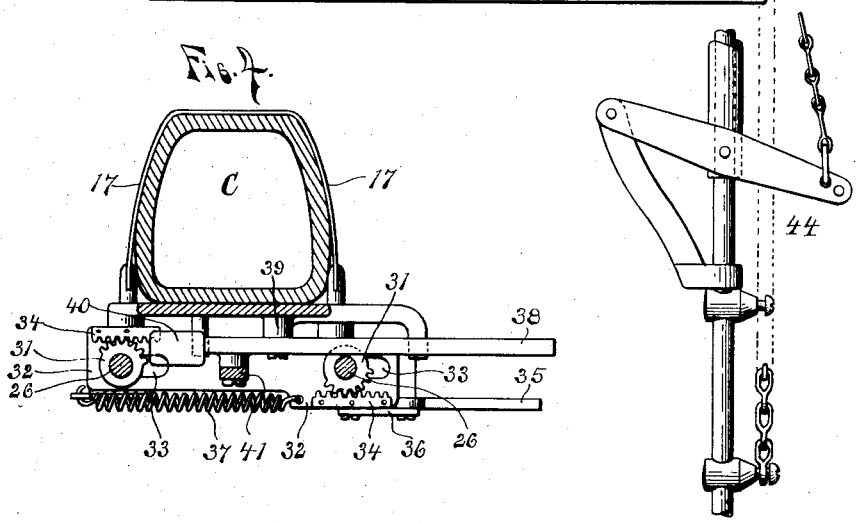
WITNESSES.
Lewis E. Flanders
Chas. A. Bernhardt
INVENTOR.
Francis P. Huyck
By
Attorneys.

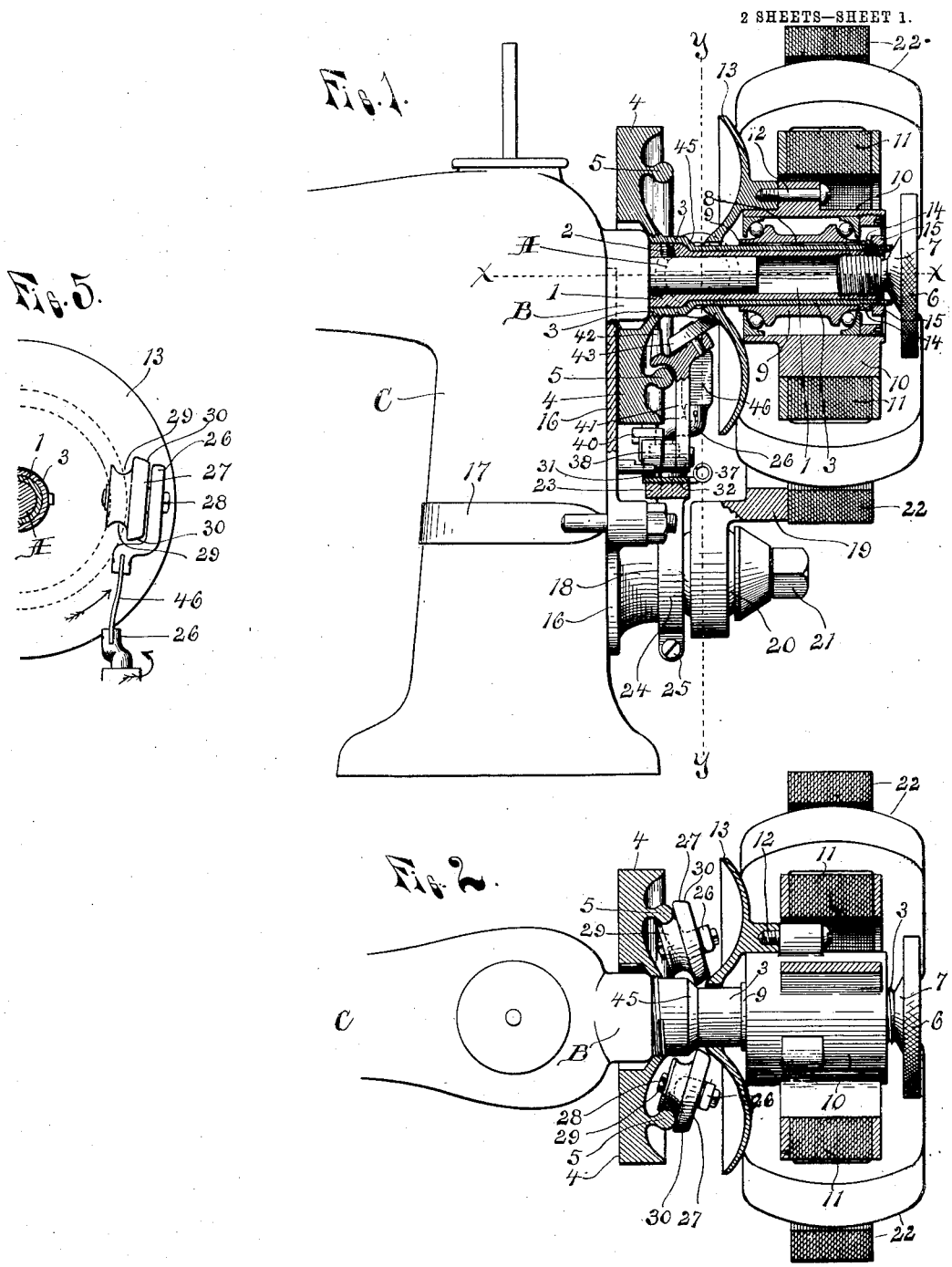

UNITED STATES PATENT OFFICE.

FRANCIS P. HUYCK, OF SWANTON, OHIO.

VARIABLE-SPEED TRANSMISSION.

No. 845,091.     Specification of Letters Patent.     Patented Feb. 26, 1907.

Application filed November 14, 1904. Serial No. 232,602.

*To all whom it may concern:*

Be it known that I, FRANCIS P. HUYCK, a citizen of the United States of America, residing at Swanton, in the county of Fulton and State of Ohio, have invented certain new and useful Improvements in Variable-Speed Transmission, of which the following is a specification, reference being had therein to the accompanying drawings.

This invention relates to a variable-speed transmission especially adapted for sewing-machines or machines of a like character; and its object is to provide simple and compact means for transmitting a variable motion from a motor or suitable driving member to the driving-shaft of the sewing-machine or to a suitable driven member connected therewith and also to provide a friction-drive which performs the functions of a clutch as well as a variable-speed transmission, the power-transmitting member being so arranged that it is normally held out of operative position and in such relation to the opposed member that when thrown into contact therewith power will be transmitted at the minimum speed, which speed may then be gradually increased to the maximum, and thus strains, &c., incident to starting at a rate of speed higher than the minimum are avoided.

A further object of the invention is to so construct the device that the contact between the driving or driven member and the power-transmission member may be broken at any time to instantly stop the operation of the device and to so construct and arrange the said friction members that their operation will not be impaired by the wearing away of their contact-surfaces, and it is also an object of the invention to provide a device having the advantages of the particular arrangement, construction, and combination of parts, all as hereinafter more fully described, reference being had to the accompanying drawings, in which—

Figure 1 is a central vertical section of a device embodying the inventon with the supporting means partly in side elevation; Fig. 2, a section substantially on the line *x x* of Fig. 1, showing the sleeve on the sewing-machine shaft and the hub of the armature in elevation; Fig. 3, a section on the line *y y* of Fig. 1; Fig. 4, a section on the line *z z* of Fig. 3, and Fig. 5 is a detail illustrating the operation of the flexible supporting-arms for the rolls.

In the drawings the transmission device is shown attached to the driving-shaft A of an ordinary sewing-machine, which shaft projects through a boss B on the rear side of the sewing-machine arm C, the parts being so arranged as to particularly adapt it for attachment in this manner, but it may be attached to the motor or otherwise supported where a motor is employed which is not also attached directly to the shaft.

1 is an extension-sleeve secured to the projecting end A of the shaft by a set-screw 2, and loosely mounted on this sleeve is a second sleeve or tubular member 3, to the inner end of which a disk 4 is secured, having a ring-shaped track 5 formed integral therewith, said track being round or circular in cross-section and connected to the body of the disk by a narrow neck. The said disk and its tubular member 3 form the driven member of the transmission, and to secure the same to the extension-sleeve 1 to turn the shaft a hand-wheel 6, provided with a screw-threaded shank to engage the internally-screw-threaded end of sleeve 1 and with a cone 7 to engage the end of sleeve 3, is provided. On the tubular member 3 or hub portion of the driven member is a lug or feather 8, engaging a groove in a bearing-sleeve 9 to hold said sleeve from turning thereon and also to permit a free longitudinal movement of the sleeve, and mounted upon said bearing-sleeve is the hub 10 of the electric-motor armature 11, said hub and sleeve being provided with opposed cone-bearings with balls between.

Sleeved upon the tubular extension 3 of the driven member and free to turn thereon, together with the hub of the armature, to which it is secured by screws 12, is a friction-disk 13, formed with a circular concave channel opposite the ring-track 5, the surface of said concave being in cross-section concentric with the centers of the cross-sectional circular areas of the ring. Sleeved upon the outer end of the member 3, which end is externally screw-threaded, is a spring 14, engaging the outer end of the longitudinally-movable bearing-sleeve 9 and held in place thereon by an adjustable screw-collar 15 to regulate the tension of said spring, which exerts a force to move the bearing-sleeve, together with the armature and disk 13, supported thereby, toward the disk 4.

16 is a supporting-plate engaging the boss B at its upper end and secured to the rear side of the arm C by a strap 17, embracing the arm and attached at its ends to the plate. Projecting from the face of this plate, near its lower end, is a boss 18, to which a bracket 19 is detachably and adjustably secured by a universal joint 20, the parts of which are held by an axial bolt 21, and secured to the outer end of this bracket is the field 22 of the motor.

A supporting-bar 23 is secured to the boss 18 by downwardly-extending clamping-arms 24, embracing said boss and secured thereto by a clamping-screw 25, and pivotally secured to said bar are two upwardly-extending arms 26, their lower ends extending through and turning freely in openings in said bar located vertically beneath the axes of the cross-sectional circular surfaces of the ring, said section being taken on a horizontal plane extending through the axis of said disk 4. These arms 26 are bent laterally from beneath the disk 4, and on their upper ends are carried the power-transmission rolls 27, revoluble upon fixed pins or bolts 28, extending laterally therefrom. Each roll is formed with a semicircular groove 29 to engage the circular surface of the ring-track 5 and also with a contact-flange 30 at one side of said groove formed to engage the concave surface of the disk 13.

Secured upon each arm 26 adjacent to the upper surface of the supporting-bar is a gear or sector 31, and resting upon the bar beneath the sectors is a longitudinally-movable plate 32, having slots 33, through which the arms extend, and provided with racks 34 to engage the sectors and turn the arms, said racks being so arranged that the arms will be turned in opposite directions thereby, thus swinging the rolls toward or from the shaft, the track 5 forming the center around or upon which said rolls turn. A bell-crank lever 35, pivoted to a downwardly-extending arm on the bar 23 and connected to the plate 32 by a link 36, is provided to move said plate and its racks in one direction, and a coiled spring 37, attached at one end to said plate and at its opposite end to the supporting-bar, is provided to move the plate in the opposite direction, which movement turns the rolls inward toward the shaft.

A lever 38 is pivoted intermediate its ends at 39 upon the supporting-plate 16 beneath the edge of the disk 4, and to one end of said lever is pivotally attached a brake-shoe 40 to engage the periphery of said disk. A bar 41 is pivotally attached at one end to the lever 38 between its pivot and the shoe directly beneath the sewing-machine shaft, and to guide said bar vertically upwardly-extending arms 42 are provided on the upper end of said bar to engage the tubular member 3 at each side adjacent to the disk 4. On the upper end of said bar 41 is journaled a roll 43, which when the bar is raised by the operation of the lever 38 will engage the concave surface of the disk 13 near the tubular member and move said disk longitudinally of said member against the action of the spring 14.

When the lever 38 is turned by suitable foot-lever mechanism 44 and the disk 13 thereby moved away from the rolls 27, interposed between said disk and ring 5, said rolls will at once be swung inward by the spring 37, operating to turn their arms, and the inner edges of the flanges of said rolls will rest against a shoulder 45 on the tubular or hub portion of the driven member out of contact with the disk 13, as shown in Fig. 2. The transmission of motion from the motor is thus stopped, and at the same time the brake 40 is applied to the disk to stop the sewing-machine.

The motor, with its disk 13, being in motion, the machine is started by the foot-lever mechanism which is attached to the outer end of the bell-crank 35, said bell-crank being turned thereby to move the plate 32 and revolve the arms 26, swinging the rolls outward between the disk and ring until the desired speed is attained. The greater distance from the shaft at which the rolls contact the disk the faster said rolls will be turned, and as the rolls are always automatically swung to their normal position against the shoulder 45 when the disk is moved out of contact therewith to stop the machine the machine always starts at a slow speed, thus preventing all strains and breakage from sudden starting.

In a large and heavy transmission where the spring 14 is necessarily strong and presses the disk with much force toward the ring a great deal of power is required to swing the rolls outward against this heavy frictional contact, and therefore in each of the supporting-arms 26 is inserted a flat spring 46 with its width extending at right angles to the axial line of the roll, so that when the arm is turned to swing the roll outward the resistance of the contact of the roll with the disk will cause the spring to bend slightly, as shown in Fig. 5, thus tilting the roll, so that its axial line does not extend radially toward the axial line of the disk, or, in other words, so that the direction of travel of said roll upon the face of the disk is changed or the roll turned from its normal path, which is concentric with the axis of the disk, to travel in a spiral path. Said roll when so tilted will therefore travel toward or from the center of the disk, according to the direction in which the disk is being revolved and in which the roll is tilted. As soon as the force tending to turn the arm is removed the spring will straighten out, and thus square the roll with its concentric path of travel upon the face of the disk, in which position it will remain, transmitting a uniform rate of speed, until again moved or tilted by the moving of the lever or released by the separation of the disk and track.

By providing separate contact-faces on the power-transmission rolls the uneven wearing away of the faces will not impair the efficiency of the device, and by making one of these contacts a groove to engage a track formed to fit the same an extended frictional surface is secured.

The device is especially adapted for use with alternating-current motors, as shown, where the speed of the motor is constant; but it is obvious that a direct-current motor may be used or any other suitable motor may be employed and connected to the shaft, with the transmission interposed between the motor and shaft.

Having thus fully described my invention, what I claim is—

1. The combination with a sewing-machine head and the driving-shaft of said machine, of an extension-sleeve on said shaft, an electric motor having its armature mounted upon said sleeve, a variable-speed transmission mechanism mounted upon the shaft between the motor and machine-head and connected to said motor and shaft, and means for operating the transmission mechanism to change the speed.

2. The combination of a driving and an opposing driven member one of which is formed with an annular convex contact-surface and a transmission member interposed between said members and adapted to be turned laterally in contact with the convex surface to vary its path of travel on the opposing member.

3. The combination of a driving and an opposing driven member one of which is formed with an annular convex contact-surface, and a transmission member interposed between said members and formed with a concave contact-surface to engage the convex surface of one member and a separate contact-surface to engage the other member.

4. The combination of a member having an annular convex contact-surface an opposing member having an annular concave contact-surface the axis of which concavity coincides with the axis of the convexity of the opposing member, a power-transmission member interposed between said members, and means for supporting the transmission member in contact with the convex surface and permitting the same to turn laterally thereon to vary its path of travel on the concave surface.

5. The combination of a member having a circular concave, an opposing member having a ring-shaped track, a power-transmission member contacting the track at one side and engaging the concave at its opposite side, and means for supporting the transmission member and turning the same upon the ring-shaped track toward or from the axis of the same to vary its point of contact with the concave of the opposing member.

6. The combination with a driving and a driven member, one of said members being formed with a circular concave and the other provided with a ring-track, of a power-transmission roll interposed between said members, a support upon which the roll is journaled, and means for turning the roll on the track toward the axis of said member and normally holding the same out of contact with the concave of the other member.

7. The combination with a disk, of a power-transmission roll, a support for the roll upon which it is journaled, a spring to normally hold the roll in a position to transmit a constant speed and means for tilting the roll against the action of said spring.

8. The combination with a driving and a driven member, of a power-transmission roll interposed between said members to engage the same, a flexible support for said roll upon which it is journaled, and means for flexing said support to tilt the roll.

9. The combination of a driven member having a ring-shaped track, a driving member opposing the driven member and formed with a circular concave, a transmission-roll adapted to engage the track at one side and the concave at the opposite side, a pivotal support upon which the roll is journaled, a spring to turn the support and normally hold the roll turned inward on its track out of engagement with the driving member.

10. The combination of a member having a ring-shaped track, an opposing member having an annular concave, a roll having a groove to engage the track and a flange at one side of the groove forming a face to engage the concave, and means for supporting the roll and turning the same upon the track.

11. The combination of a driving and a driven member, a power-transmission roll, a support upon which the roll is journaled, a spring to turn and normally hold the roll out of engagement with one of said members, a spring to yieldingly force one member toward the other, and means for separating said members against the action of said spring.

12. The combination of a driving and a driven member, one of which members is formed with a circular track formed with a convex contact-face, a power-transmission roll interposed between said members in contact with said track at a point in a horizontal plane extending through the axis of said track, a pivoted support for the roll having the vertical axis of its pivot coinciding with a vertical line extending through the axis of the convexity of the track opposite the point of engagement of the roll with said track, and means for turning the support.

13. The combination of a driving and a driven member, one of said members being free to move toward and from the other, a power-transmission roll interposed between said members, a spring to press the movable member toward the opposed member, a lever pivoted intermediate its ends, foot-operated mechanism attached to one end of said lever, a brake-shoe attached to the opposite end of said lever and adapted to engage the driven member, and means carried by said lever for engaging and separating said members when said lever is operated to set the brake.

14. The combination of a ring-shaped track having a rounding contact-surface, an opposed disk having a circular concave concentric with said track, a supporting-bar below the ring-track, supporting arms pivoted on said bar, each with the vertical axis of the pivot coinciding with a vertical line extending through the center of the area of the ring in cross-section on a horizontal plane through the axis of the ring, power-transmission rolls journaled on the upper ends of said arms to engage the track and disk, and means for turning said arms.

15. The combination with a driving and a driven member, of a supporting-bar, arms journaled at one end in openings in said bar, power-transmission rolls journaled on the upper ends of said arms between said members, segments on said arms, racks to engage said segments, a lever to move the racks in one direction and a spring to move the same in the opposite direction.

16. The combination of a disk having a circular groove and adapted to be attached to a motor to form the driving member, a driven member having a ring-shaped track formed round in cross-section, a support below said members, arms pivotally attached at their lower ends to said support and extending upward at each side of the ring-track, a power-transmission roll journaled on the upper end of each arm and provided with a groove to engage the track and a flange at one side of the groove to engage the concave of the disk, and means for turning said arms simultaneously in opposite directions.

17. The combination with a driving and a driven member, of a power-transmission roll interposed between said members, a pivoted support upon the upper end of which the roll is journaled, a flat spring inserted in the support with its width extending at right angles to the axis of the roll and forming a part of the support, and means for turning the support and flexing the spring to tilt the roll.

18. The combination of a longitudinally-movable driving member having a circular concave, an opposed driven member having an integral ring-shaped track formed round in cross-section, a spring to force the driving toward the driven member, a supporting-bar beneath said members, arms pivoted at one end on said bar and extending upwardly between said members, power-transmission rolls journaled on the upper ends of said arms and each provided with a groove to engage the track and a flange to engage the concave, gear-segments on the lower ends of said arms, racks to engage the segments and turn the arms in opposite directions, a lever to move the racks to turn the rolls outward upon the track, a spring to move the racks to turn the rolls inward into engagement with the hub of the driven member and out of engagement with the driving member, a lever pivoted intermediate its ends, means carried by one end of said lever for separating the driving and driven members, and foot-operated means attached to said levers.

19. The combination with a sewing-machine driving-shaft, of an electric motor-armature mounted on said shaft to turn freely thereon, a motor-field rigidly supported in proper relation to the armature, a disk forming a driving member secured to the armature and having a circular concave, a disk forming the driven member secured to the shaft and having an integral ring-shaped track formed round in cross-section opposing the concave of the disk, a supporting-bar below said members, arms pivotally secured at one end in openings in said bar and extended upward between said members, power-transmission rolls journaled on the upper ends of said arms and each having a groove to engage the track and a flange at one side of the groove to engage the concave, gear-segments secured to said arms, rack-bars supported on said bar to engage and turn the segments in opposite directions, a lever to move said racks in one direction and a spring to move the same in the opposite direction, a lever pivoted intermediate its ends beneath the driven disk, a brake-shoe on one end of said lever to engage said disk, a bar pivotally attached to said lever between its pivot and the shoe, arms on said bar extending upward at each side of the shaft, a roll on said bar to engage the driving-disk and move the same from the driven member, and foot-operated means attached to said levers.

20. The combination with the supporting-arm and driving-shaft of a sewing-machine, of an extension-sleeve secured on the shaft, a bearing-sleeve longitudinally movable on the extension-sleeve and attached to turn therewith, an armature mounted on the bearing-sleeve free to turn thereon, a disk forming a driving member having a circular concave and secured to the armature, a collar on the outer end of the extension-sleeve, a spring interposed between the collar and end of the bearing-sleeve, a disk forming the driven member mounted on the extension-sleeve to turn therewith and provided with a ring-shaped track formed round in cross-section and connected to the disk by a narrow neck, a supporting-plate secured to the supporting-arm of the sewing-machine, a boss on said plate, a motor-field ring, a supporting-bracket to which the field is secured, a universal joint for securing the bracket to the boss, a supporting-bar secured to said boss, supporting-arms pivotally secured in openings in said bar and extending upward between the driving and driven members, rolls journaled on the upper ends of said arms each having a groove to engage the track and a flange at one side of the groove to engage the concave, a flat spring inserted in each arm and forming a part thereof, a segmental gear on each arm, a plate on the supporting-bar having slots through which the arms extend and provided with racks to engage the gear-segments, a spring attached at one end to the bar and at its opposite end to the plate to move the plate in one direction, a bell-crank lever to move the plate in the opposite direction, a lever pivoted intermediate its ends on the supporting-plate beneath the driven disk, a brake-shoe on said lever, a bar pivotally attached at one end to said lever and having upwardly-extending arms embracing the hub of the driven member, a roll journaled on the upper end of said bar, and foot-operated means attached to the ends of the levers to operate the same.

In testimony whereof I affix my signature in presence of two witnesses.

FRANCIS P. HUYCK.

Witnesses:
DAVID HUYCK,
BUD A. GEHUNG.